United States Patent [19]

Menendez

[11] Patent Number: 4,901,424
[45] Date of Patent: Feb. 20, 1990

[54] METHOD OF FORMING AN END SEAL FOR A PIPE LINER

[75] Inventor: Hernan R. Menendez, Millington, Tenn.

[73] Assignee: Insituform of North America, Inc., Memphis, Tenn.

[21] Appl. No.: 224,469

[22] Filed: Jul. 26, 1988

[51] Int. Cl.⁴ .................. B23P 11/00; B29C 63/34
[52] U.S. Cl. ............................... 29/451; 138/97; 156/287; 156/294; 264/36; 264/269; 264/516
[58] Field of Search ............... 29/451, 402.09; 138/97, 138/98; 156/287, 294; 264/36, 269, 500, 516

[56] References Cited

U.S. PATENT DOCUMENTS

| 4,009,063 | 2/1977 | Wood | 156/71 |
| 4,064,211 | 12/1977 | Wood | 264/95 |
| 4,529,008 | 7/1985 | Appleton | 138/97 |
| 4,622,196 | 11/1986 | Wood | 264/229 |
| 4,637,754 | 1/1987 | Wood | 405/150 |
| 4,752,511 | 6/1988 | Driver | 428/36 |

Primary Examiner—Jan H. Silbaugh
Assistant Examiner—Christopher A. Fiorilla
Attorney, Agent, or Firm—James & Franklin

[57] ABSTRACT

In order to effectively seal the space between a preexisting pipe and a repair lining that has been inserted into the pipe and radially expanded in order to generally conform to the interior of the pipe, a form is inserted between the ends of the pipe and lining before the lining is radially expanded, the lining therefore conforms to the interior of the pipe along its length and to the interior of the form at its ends, the form is removed, a sealing ring is inserted into the space left by the form and is there sealingly compressed, and an element is inserted into that space axially outside the sealing ring in order to retain it in position and preferably to compress it axially of the pipe.

18 Claims, 2 Drawing Sheets

METHOD OF FORMING AN END SEAL FOR A PIPE LINER

This invention relates to an improved method for sealing the space between a pipe and a lining that has been inserted into the pipe and caused to conform to the pipe's interior.

Frequently passageway or pipe carrier surfaces become or are unsuitable for their intended purpose. For example, a newly formed pipe length for carrying fluid may have a small fracture or hole, or the inner surface may be imperfectly formed so as to be unsuitable for the intended purpose, or, in the case of an existing pipe length, the inner surface may have become unsuitable simply as a result of wear and tear through usage. With underground passages, such as sewers and mine shafts, the walls defining such passages often deteriorate as a result of use, thereby allowing undesirable leakage therethrough into the passage of fluid such as water from the outside of the passage, or the leakage therethrough from the inside of the passage of the fluid being carried by the passage. Also, in the case where an underground passage carries a fluid medium such as sewage, erosion of the surface defining the passage by the flow of the fluid and solid matter therein can make the surface rough and irregular, causing difficulties with the flow of the fluid.

Replacement of the pipe length or of the whole pipe in the case of pipelines, or the formation of a new underground passage, is extremely undesirable from an economic point of view and may be impossible to accomplish from a practical point of view. Accordingly there have been many proposals in the past to repair or rehabilitate such pipes (the term "pipe" being here used in its broadest sense to comprehend any fluid passageway) by inserting a lining of appropriate material into the pipe and causing that lining to conform to the interior of the pipe, thereby in effect to form a new pipe without having to remove the old one. In general such methods involve inserting into the pipe from one end thereof an elongated lining which, in order to permit its insertion, is normally smaller in cross-section than the pipe itself and then causing that lining to expand into engagement with the inner surface of the pipe, usually by means of internal pressure applied to the lining. While the lining is thus pressed against the interior of the pipe it is caused to remain in that pipe-engaging position, either through the use of an adhesive between the pipe and the lining or by causing the lining to harden when it is in its pipe-engaging position, or both. One such method is that disclosed in Wood U.S. Pat. No. 4,009,063 of Feb. 22, 1977, entitled "Method of Lining a Pipe", that procedure involving the use of a resin-impregnated felt lining which is inserted into the pipe by being everted, the resin in the felt setting when the lining is forced against the interior of the pipe. The end-sealing method of the present invention can be used with the pipe lining process of that Wood patent, but its use is not limited thereto. It can be used with many other lining methods and lining structures.

One problem that arises with pipes thus lined is that the joint between the lining and the pipe is not perfect, fluid tends to accumulate between the lining and the pipe, and that fluid tends to flow along the length of the pipe and to escape at the ends of the lined pipe. Fluid can enter that space either from the outside, passing through the very defects in the pipe which the lining is designed to ameliorate or, and particularly when the fluid within the lined pipe is under pressure, that fluid can escape through minor cracks in the liner into the space between the liner and the pipe.

It is therefore desirable in most underground lined pipe installations, and in virtually all lined pressure pipe installations, to seal the ends of the joint between the lining and the pipe in order to prevent the escape of any fluid which may accumulate in that joint. A common way to make such a seal is to use what is generally termed an "O-ring", a ring of compressible sealing material, which may or may not have an essentially circular cross-section, which ring is compressed between the tube and lining at the ends of the lined tube, thereby to produce a static pressure seal. In order for such a sealing instrumentality to function properly, it should be able to move and deform as compelled by changes in the hydrostatic pressure to which it may be subjected over time. Moreover, it must be so mounted between the pipe and the lining as to remain in compression over the very extended period of time (years) that it is in use, since it seals properly only when compressed to at least a proper degree but not when it is excessively compressed. A compression of between 15% and 30% of the initial ring thickness is usually appropriate for proper sealing. In addition, the mounting for the sealing ring must permit that ring to expand axially when it is sealingly compressed radially after it has been put into place.

Any attempt to install the sealing ring between the pipe and lining at their ends before the lining is radially expanded into engagement with the interior of the pipe is fraught with problems, both because it is under those circumstances difficult to control the degree to which the sealing ring is compressed—it usually is over-compressed under these conditions—and because there is little or no leeway provided for permitting the sealing ring to adapt itself to the varying conditions to which it is subjected over time, since it is locked in place by the expanding lining in such a way that it cannot expand axially if it is later subjected to radial compression.

In accordance with the present invention these disadvantages are overcome by ensuring that when the lining is radially expanded into engagement with the pipe and then fixed into its final shape, that rigidified lining at the ends of the pipe defines between itself and the pipe a cavity of a size properly related to the size of the sealing ring to be employed, but before the sealing ring is put in place. This is done by providing the pipe ends with a cylindrical form against which the lining ends are caused to conform and then, after the lining is hardened, withdrawing the form, thereby to produce the cavity space for the sealing ring.

The sealing ring, of an original thickness properly greater than the thickness of the space, is then inserted into that space, thus being compressed in its thickness for proper sealing action while consequent axial expansion is permitted. The sealing ring is preferably pushed into the space until it comes to and is pressed up against the axial end thereof, and the end is preferably provided with a tapered shape by tapering the corresponding axial end of the cylindrical form. Thereafter, to retain the sealing ring in position, the axially outer portion of the space left by the removal of the cylindrical form is filled with packing material, preferably in the form of a cylinder similar to the original cylindrical form, although any type of packing material which will reliably remain in that space can be employed. Thus the sealing ring is properly compressed and, within reasonable limits, can adapt itself to the conditions that it may be called upon to meet.

To the accomplishment of the above, and to such other objects as may hereinafter appear, the present invention relates to a method of sealing the ends of the joint between the ends of a pipe and a pipe lining, and to the structure involved, as defined in the appended claims and as described in this specification, taken together with the accompanying drawings in which:

As is appropriate, and in view of the comments above, my invention is here disclosed generically for the lining of a pipe 2 with a lining 4 designed to be inserted into the pipe 2 and then forced outwardly into conformity with the interior of the pipe 2 in any appropriate manner, as by means of the application of pressure thereto, and there retained in place, as by the setting of impregnating resin, the use of adhesive, or in any other fashion. Since it is at the ends of the pipe 2 that sealing of the joint between the pipe 2 and the lining 4 is required, only one end of the pipe 2 is here illustrated, that end being provided, as is conventional, with a mounting flange 6 provided with holes 8 for mounting bolts, thereby to connect that pipe end to some other structure with which the pipe is to communicate, as, for example, another similarly constructed section of pipe.

Figure 2:
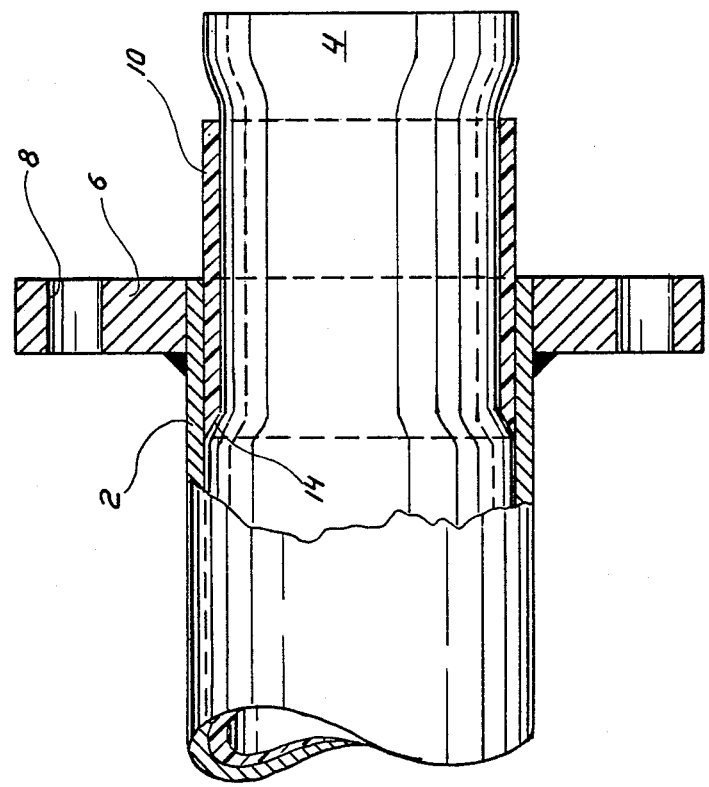
FIG. 2 is a view similar to FIG. 1 but showing the pipe and cylindrical form with a pipe lining in place and expanded to conform to the interior of the pipe and the cylindrical form.
Figure 1:
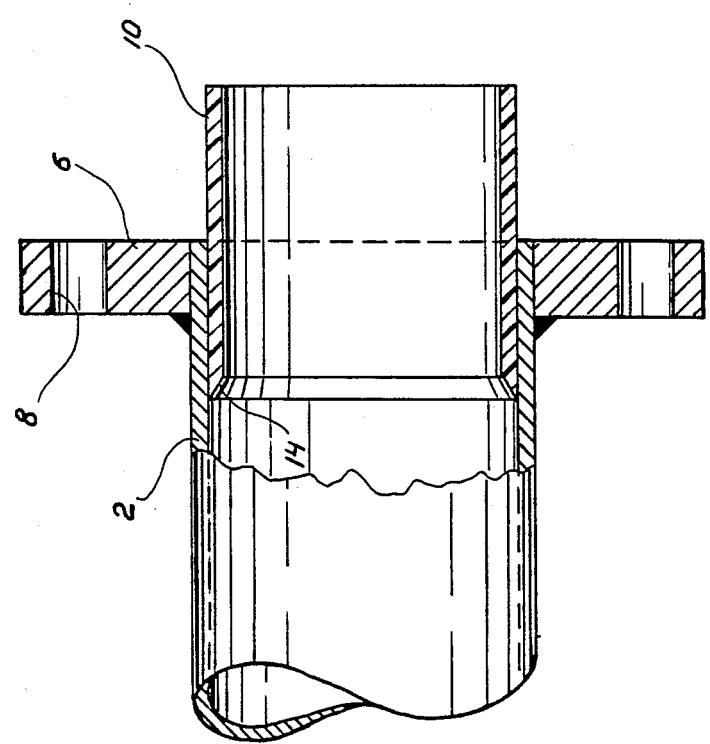
FIG. 1 is a side elevational view, partially broken away on cross-section, of a pipe to be lined, with the cylindrical form of the present invention in place.

As shown in FIG. 1, before the pipe lining is inserted into the pipe 2 a cylindrical form 10 is snugly inserted into the pipe end for a predetermined distance. For example, with an 8" diameter pipe the form 10 might extend 2-4" into the pipe (the proportions shown in the drawing are only illustrative). The thickness and shape of the form are selected taking into consideration the thickness of the sealing ring 12 to be used, the thickness of the wall of the form 10 being an appropriate fraction of the thickness of the sealing ring 12, as will be explained later. The form 10 may be made of any suitable material capable of withstanding the pressures and temperatures to which it is subjected in use, it also being important that it not bond itself either to the interior of the pipe 2 nor to the exterior of the lining 4, so that it can readily be removed from the interior of the pipe 2 after the lining procedure per se has been accomplished. Nylon plastic sheet is an excellent material for this purpose, as are polyethylene and Teflon. As shown in FIGS. 1 and 2, it is preferred that the leading edge of the form 10 be tapered.

After the form 10 has been put in place, the lining 4 is then inserted into the pipe 2 in any appropriate manner and then, as by the application of internal pressure, forced radially outwardly into engagement with the inner surface of the pipe 2, the lining 4 then retaining its expanded shape, as, for example, by being formed in part of a hardenable resin which sets after the lining 2 has been expanded. As can be seen from FIG. 2, that portion of the end of the lining 4 which is received within the form 10 takes the shape of the interior of the form 10, including the shape of the tapered leading edge 14.

Figure 3:
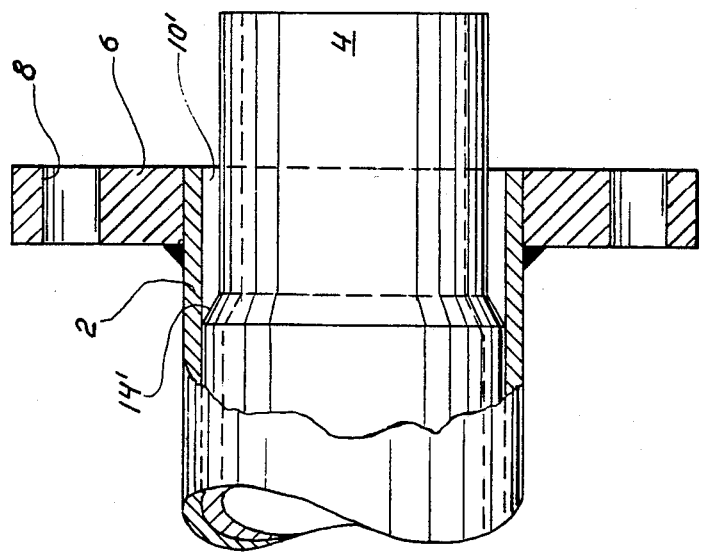
FIG. 3 is a view similar to FIG. 2 but with the cylindrical form removed.

Next, as shown in FIG. 3, the form 10 is withdrawn, as by being pulled out, leaving behind it the cylindrical cavity 10', complete with tapered edge 14'.

Figure 4:
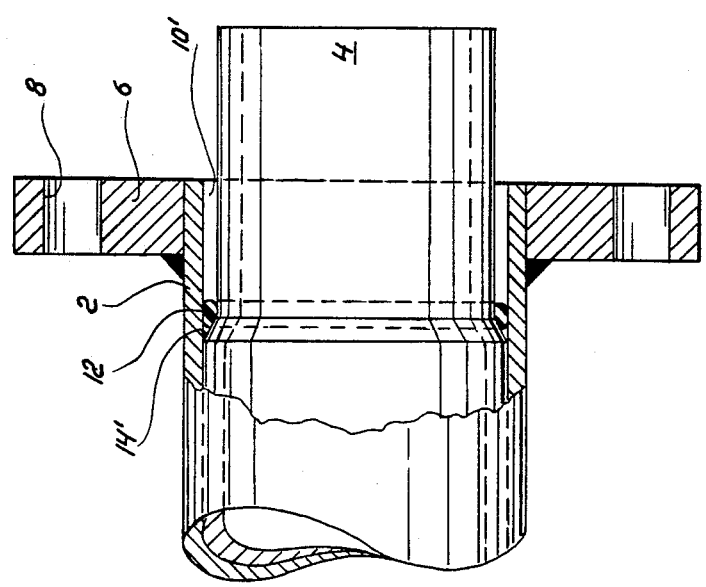
FIG. 4 is a view similar to FIG. 3 but with the sealing ring inserted.

Next, as shown in FIG. 4, the sealing ring 12 is pushed into the cavity 10' up to the axially inner end thereof where it engages the tapered edge 14'. The normal thickness of the sealing ring 12 is sufficiently greater than the thickness of the cavity 10' so that the ring 12 is radially compressed between the pipe 2 and the lining 4 to a degree which causes it to exert proper sealing effect, with leeway being provided for increased and decreased thickness compression of the ring 12 as, over time, the pipe 2 and lining 4 expand and contract in response to the temperature ranges to which they may be subjected. The space defined by the tapered edge 14' gives the sealing ring room to expand axially if it is further radially compressed under subsequent conditions. The sealing ring 12 can be lubricated with silicone, grease or other suitable material for ease of installation, and standard packing tools can be used to carry out this procedure.

Figure 5:
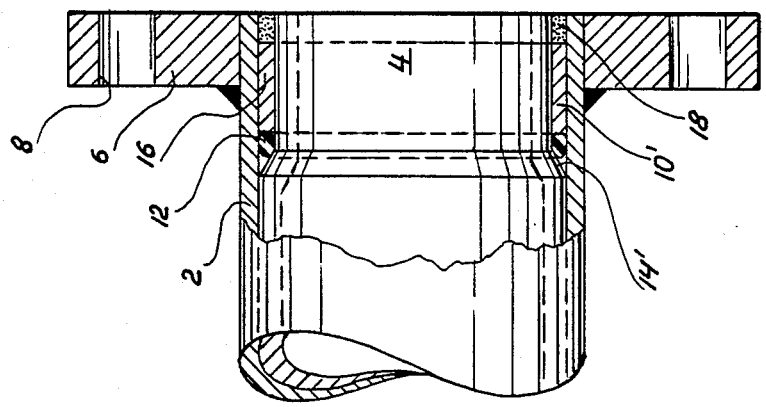
FIG. 5 is a view similar to FIG. 4 but with packing means inserted behind the sealing ring.

Once the sealing ring 12 is properly seated against the end edge 14' of the cavity 10', packing material 16 is inserted into the cavity 10' both to retain the sealing ring 12 in its position against the edge 14' and to provide proper radial support for that portion of the lining 4 which defines the cavity 10'. The packing material should therefore substantially fill the cavity 10' and fit tightly while of sufficient rigidity to properly support the lining 2. The same plastic material used for the cylindrical form 10 can be used for this purpose provided that it is compatible with the substances to be carried by the pipe or to which the interior of the pipe may be subjected. As shown in FIG. 5, therefore, the packing material 16 is shown in the form of a cylinder which can be pushed into the cavity 10' via its open end. The axial length of the cylinder 16 may be such as to extend flush with the end of the pipe 2 or, as specifically shown in FIG. 5, it may extend to a point inside the cavity 10', with the remainder of the cavity being filled with some other material 18, such as a flexible epoxy grout such as is frequently used in other places in installations of the type here under discussion.

Since the packing cylinder 16 is not subjected to the liner-setting conditions to which the cylindrical form 10 often is exposed, involving high pressures and temperatures, and because it need not be readily removable from the cavity 10 but only capable of being inserted thereinto, the packing cylinder 16 may be formed of many different materials, such as polysulfide silicone, ethylenepropylene rubber, Teflon, urethane, polyacrylates, neoprene or fluorocarbons, bearing in mind that the material must be compatible with the substances with which it may come in contact during use.

With this procedure the sealing ring 12 is placed in position after the lining 2 has been expanded and rigidified, and it is thus not subjected to the conditions, often involving high temperatures for extended periods of time, to which the lining is subjected in order to rigidify it. The sealing ring is so mounted as to be radially compressed to an optimum degree and rendered capable of reliably performing its sealing functions over a wide range of ambient conditions to which it may be subjected over time.

While but a single embodiment of the present invention has been here specifically disclosed, it will be apparent that many variations may be made therein, all within the scope of the invention as defined in the following claims.

I claim:

1. In conjunction with the repair of a length of pipe by inserting a lining into said pipe, the method of sealing an end of an joint between said lining and an end of said pipe which comprises:
   (a) inserting said lining into said pipe and locating a tubular form radially between said lining and said end of said pipe;
   (b) forming said lining by radially urging said lining into engagement with an interior surface of said pipe and an interior surface of said tubular form and retaining said lining in its formed condition;
   (c) removing said tubular form to leave a space between said tube and said lining;
   (d) inserting into said space formerly occupied by said tubular form a sealing ring which is radially compressed within said space, and
   (e) inserting packing means into that portion of said space formerly occupied by said tubular form which is axially between said end of said pipe and said sealing ring and securing said packing means in place, thereby to prevent escape of said sealing ring from said space.

2. The method of claim 1, in which said tubular form is inserted first into said pipe, and said lining is then inserted into said pipe through said form.

3. The method of either of claims 1 or 2, in which said sealing ring is so located in space as to engage that portion of said lining at an axially inner end of said space.

4. The method of claim 3, in which said packing means is so located in said space as to axially engage said sealing ring.

5. The method of claim 3, in which said packing means is so located in said space as to axially compress said sealing means between itself and said lining.

6. The method of either of claims 1 or 2, in which an axially inner edge of said tubular form is tapered toward said interior surface of said pipe, said lining when caused to conform to said interior surface of said pipe substantially engaging said taper.

7. The method of claim 6, in which said sealing ring is so located in said space as to engage that portion of said lining at an axially inner end of said space.

8. The method of claim 7, in which said packing means is so located in said space as to axially engage said sealing ring.

9. The method of claim 7, in which said packing means is so located in said space as to axially compress said sealing means between itself and said lining.

10. The method of either of claims 1 or 2, in which said packing means comprises a tubular form.

11. The method of either of claims 1 or 2, in which said packing means comprises a tubular form with a substantially blunt end directed toward said sealing ring.

12. The method of claim 10, in which said sealing ring is so located in said space as to engage that portion of said lining at an axially inner end of said space.

13. The method of claim 12, in which said packing means is so located in said space as to axially engage said sealing ring.

14. The method of claim 12, in which said packing means is so located in said space as to axially compress said sealing means between itself and said lining.

15. The method of claim 10, in which an axially inner edge of said tubular form is tapered toward said interior surface of said pipe, said lining when caused to conform to said interior surface of said pipe substantially engaging said taper.

16. The method of claim 15, in which said sealing ring is so located in said space as to engage that portion of said lining at an axially inner end of said space.

17. The method of claim 15, in which said packing means is so located in said space as to axially engage said sealing ring.

18. The method of claim 15, in which said packing means is so located in said space as to axially compress said sealing means between itself and said lining.

* * * * *